United States Patent
Jian (10) Patent No.: US 11,238,563 B2
(45) Date of Patent: Feb. 1, 2022

(54) NOISE PROCESSING METHOD AND APPARATUS

(71) Applicant: AUTEL ROBOTICS CO., LTD., Guangdong (CN)

(72) Inventor: Yupeng Jian, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 107 days.

(21) Appl. No.: 16/740,233

(22) Filed: Jan. 10, 2020

(65) Prior Publication Data

US 2020/0151855 A1  May 14, 2020

Related U.S. Application Data

(63) Continuation of application No. PCT/CN2018/082223, filed on Apr. 8, 2018.

(30) Foreign Application Priority Data

Jul. 11, 2017  (CN) .......................... 201710562270.5

(51) Int. Cl.
  *G06T 5/00*  (2006.01)
  *G06T 7/55*  (2017.01)
  *G06F 17/18*  (2006.01)
  *G06T 5/50*  (2006.01)

(52) U.S. Cl.
  CPC ............. *G06T 5/002* (2013.01); *G06F 17/18* (2013.01); *G06T 5/50* (2013.01); *G06T 7/55* (2017.01);
  (Continued)

(58) Field of Classification Search
  CPC .. G06T 5/002; G06T 5/50; G06T 5/20; G06T 5/00; G06T 5/003; G06T 5/001;
  (Continued)

(56) References Cited

U.S. PATENT DOCUMENTS 9,471,963 B2   10/2016  Kang et al.
9,538,162 B2 *  1/2017  Choi .................. G01S 17/36
(Continued)

FOREIGN PATENT DOCUMENTS

CN   102184531 A   9/2011
CN   103139577 A   6/2013

OTHER PUBLICATIONS

International Search Report dated Jul. 6, 2018; PCT/CN2018/082223.

*Primary Examiner* — Jose L Couso (57) ABSTRACT

The present invention discloses a noise processing method and apparatus. The method includes: selecting a pixel in an area array, which is formed by arranging a plurality of pixels in a matrix; obtaining pre-stored depth information corresponding to the pixel; performing pixel dispersion calculation according to the depth information corresponding to the pixel, to obtain at least one dispersion of the pixel, the dispersion being used to indicate a degree of dispersion between the pixel and another pixel in the area array; and identifying the pixel as a noise and removing the pixel from the area array when the at least one dispersion of the pixel is greater than a preset threshold. According to the above method, the dispersion between the pixel and the another pixel in the area array is calculated according to the depth information corresponding to the pixel, and the pixel is identified as a noise and is removed from the area array when the at least one dispersion of the pixel is greater than the preset threshold. Therefore, noises in the area array may be identified and removed, which resolves a technical problem that generated noises may affect accuracy of the depth information.

7 Claims, 6 Drawing Sheets

(52) U.S. Cl.
CPC ............... *G06T 2207/20076* (2013.01); *G06T 2207/20224* (2013.01)

(58) Field of Classification Search
CPC .. G06T 7/55; G06T 7/50; G06T 7/593; G06T 7/285; G06T 7/70; G06T 2207/20076; G06T 2207/20224; G06T 2207/10028; G06T 2207/20012; G06T 2207/30168; G06T 2207/10021; G06T 2207/10012; G06T 2207/20221; G06T 2207/20201; G06F 17/18; G06K 9/46; G06K 9/32; G06K 2009/4666; G06K 2209/40; H04N 19/597; H04N 19/80; H04N 13/243; H04N 13/271; H04N 13/25; H04N 13/111; H04N 13/122; H04N 13/239; H04N 13/128; H04N 13/161; H04N 2013/0081; H04N 2013/0085; H04N 2013/0088; H04N 5/2226; H04N 5/23264; G01S 17/36; G01S 17/86; G01S 17/894; G01P 3/38

See application file for complete search history.

(56) References Cited

U.S. PATENT DOCUMENTS

| | | | |
|---|---|---|---|
| 2010/0183236 A1* | 7/2010 | Kang | G06T 5/002 382/260 |
| 2011/0274366 A1* | 11/2011 | Tardif | G06T 5/002 382/260 |
| 2012/0158496 A1* | 6/2012 | Solomon | G06Q 30/0251 705/14.49 |
| 2012/0182394 A1* | 7/2012 | Bae | H04N 13/207 348/46 |
| 2014/0147056 A1* | 5/2014 | Kim | G06T 5/50 382/263 |
| 2014/0185921 A1* | 7/2014 | Choi | G06T 5/002 382/154 |
| 2014/0327674 A1* | 11/2014 | Sorkine-Hornung | G06T 7/557 345/426 |
| 2015/0264337 A1* | 9/2015 | Venkataraman | H04N 13/243 348/47 |
| 2016/0371821 A1* | 12/2016 | Hayashi | H04N 9/04517 |

* cited by examiner

NOISE PROCESSING METHOD AND APPARATUS

CROSS-REFERENCE

The present application is a continuation of International Patent Application No. PCT/CN2018/082223 filed on Apr. 8, 2018, which claims priority to Chinese Patent Application No. 201710562270.5 filed on Jul. 11, 2017, both of which are incorporated herein by reference in their entireties.

BACKGROUND

Technical Field

The present invention relates to the photics field, and in particular, to a noise processing method and apparatus.

Related Art

According to a time of flight (TOF) technology, a sensor emits modulated near-infrared light to an object photographed by a 3D camera measuring a depth of field, and receives near-infrared light reflected by the object. Then, the sensor calculates a distance to the photographed object by calculating a time difference or a phase difference between the emitted and reflected light, to generate depth information. Finally, based on photographing of a traditional camera, a three-dimensional outline of the object is presented with different colors representing different depth information.

In the TOF technology, because an external light source includes a component whose wavelength is close to that of the modulated light or a reflective surface is irregularly bright or dark, the received reflected light may include some noises, which may affect accuracy of the depth information.

SUMMARY

To resolve a technical problem in the related art that noises included in received reflected light may affect accuracy of depth information, the present invention provides a noise processing method and apparatus.

A message processing method includes:

selecting a pixel in an area array, which is formed by arranging a plurality of pixels in a matrix;

obtaining pre-stored depth information corresponding to the pixel;

performing pixel dispersion calculation according to the depth information corresponding to the pixel, to obtain at least one dispersion of the pixel, the dispersion being used to indicate a degree of dispersion between the pixel and another pixel in the area array; and identifying the pixel as a noise and removing the pixel from the area array when the at least one dispersion of the pixel is greater than a preset threshold.

A noise processing apparatus includes:

a selection module, configured to select a pixel in an area array, which is formed by arranging a plurality of pixels in a matrix;

an obtaining module, configured to obtain pre-stored depth information corresponding to the pixel;

a calculation module, configured to perform pixel dispersion calculation according to the depth information corresponding to the pixel, to obtain at least one dispersion of the pixel, the dispersion being used to indicate a degree of dispersion between the pixel and another pixel in the area array; and a removal module, configured to identify the pixel as a noise and remove the pixel from the area array when the at least one dispersion of the pixel is greater than a preset threshold.

A noise processing apparatus includes:

a processor, and a memory, configured to store processor executable instructions;

the processor being configured to:

select a pixel in an area array, which is formed by arranging a plurality of pixels in a matrix;

obtain pre-stored depth information corresponding to the pixel;

perform pixel dispersion calculation according to the depth information corresponding to the pixel, to obtain at least one dispersion of the pixel, the dispersion being used to indicate a degree of dispersion between the pixel and another pixel in the area array; and identify the pixel as a noise and remove the pixel from the area array when the at least one dispersion of the pixel is greater than a preset threshold.

The technical solutions provided in the embodiments of the present invention may achieve the following beneficial effects:

The method includes: selecting a pixel in an area array, which is formed by arranging a plurality of pixels in a matrix; obtaining pre-stored depth information corresponding to the pixel; performing pixel dispersion calculation according to the depth information corresponding to the pixel, to obtain at least one dispersion of the pixel, the dispersion being used to indicate a degree of dispersion between the pixel and another pixel in the area array; and identify the pixel as a noise and remove the pixel from the area array when the at least one dispersion of the pixel is greater than a preset threshold. According to the above method, the pixel in the area array is selected, the dispersion between the pixel and the another pixel in the area array is calculated according to the depth information corresponding to the pixel, and the pixel is identified as a noise and is removed from the area array when the at least one dispersion of the pixel is greater than the preset threshold. Therefore, noises in the area array may be identified and removed, which resolves a technical problem that generated noises may affect accuracy of the depth information.

It should be understood that the above general descriptions and the following detailed descriptions are merely exemplary, and cannot limit the present invention.

BRIEF DESCRIPTION OF THE DRAWINGS

The accompanying drawings, which are incorporated herein and constitute a part of the present specification, illustrate embodiments consistent with the present invention and, together with the description, serve to explain the principles of the present invention. Apparently, the accompanying drawings in the following description merely show some embodiments of the present invention, and persons of ordinary skill in the art can derive drawings of other embodiments from these accompanying drawings without creative efforts.

DETAILED DESCRIPTION

Exemplary embodiments are described in detail herein, and examples of the exemplary embodiments are shown in the accompanying drawings. When the following descriptions involve the accompanying drawings, unless otherwise indicated, same numbers in different accompanying drawings represent same or similar elements. Implementations described in the following exemplary embodiments do not represent all implementations consistent with the present invention. On the contrary, the implementations are merely apparatus and method examples that are consistent with some aspects of the present invention described in detail in the appended claims.

Figure 1:
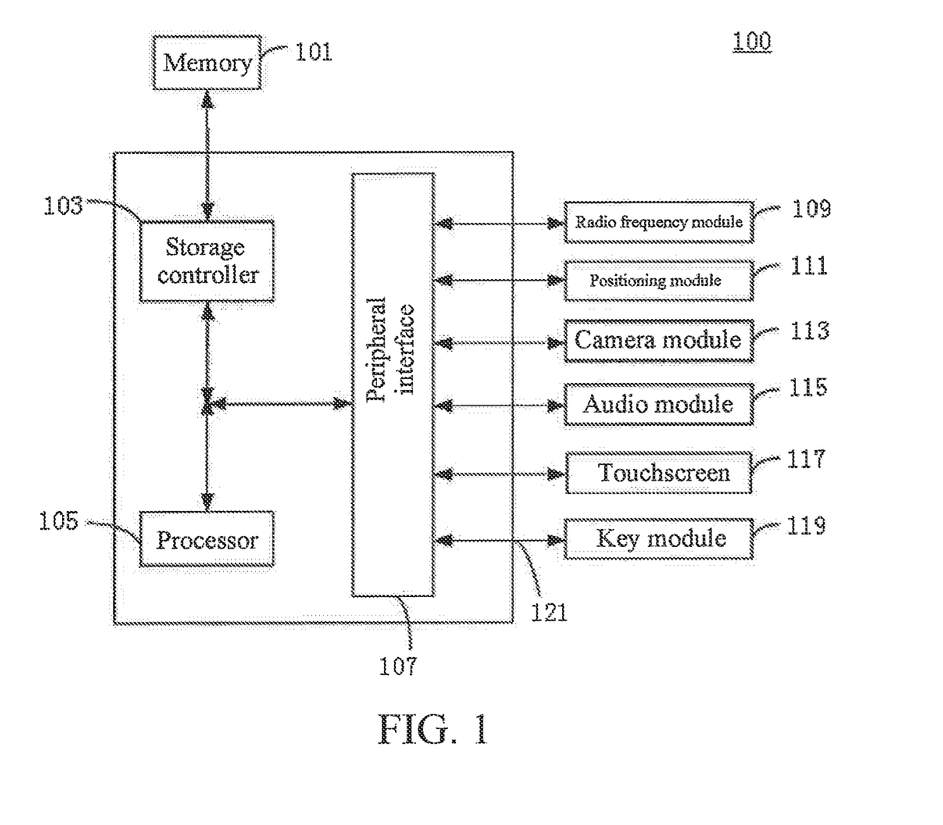
FIG. 1 is a block diagram of an electronic device according to an exemplary embodiment.

Referring to FIG. 1, FIG. 1 is a block diagram of an electronic device according to an exemplary embodiment. It should be noted that the electronic device 100 is merely an example adapted to the present invention, and should not be considered as any limitation to the scope of the present invention. The electronic device 100 cannot be explained as needing to reply on or needing to have one or more components in the exemplary electronic device 100 shown in FIG. 1.

As shown in FIG. 1, the electronic device 100 includes a memory 101, a storage controller 103, one or more (only one is shown in the figure) processors 105, a peripheral interface 107, a radio frequency module 109, a positioning module 111, a camera module 113, an audio module 115, a touchscreen 117 and a key module 119. These components communicate with each other by using one or more communications buses/signal lines 121.

The memory 101 may be configured to store a software program and module, such as a program instruction and module corresponding to a noise processing method and apparatus in the exemplary embodiments of the present invention. The processor 105 performs various functions and data processing by running the software program stored in the memory 101, thereby implementing the above noise processing method in an application program running in the electronic device 100.

The memory 101, as a carrier for resource storage, may be a random storage medium such as a high speed random access memory, a non-volatile memory such as one or more magnetic storage apparatuses, a flash memory, or another solid-state memory. The storage may be transient storage or permanent storage.

The peripheral interface 107 may include at least one wired or wireless network interface, at least one series-parallel conversion interface, at least one input and output interface, at least one USB interface, and the like, to couple external input/output apparatuses to the memory 101 and the processor 105, to implement communication with the external input/output apparatuses.

The radio frequency module 109 is configured to receive and send electromagnetic waves, and implement mutual conversion between an electromagnetic wave and an electric signal, to communicate with another device through a communications network. The communications network includes a cellular telephone network, a wireless local area network, or a metropolitan area network. The communications network may use various communications standards, protocols and technologies.

The positioning module 111 is configured to obtain a current geographical location of the electronic device 100. The positioning module 111 includes, for example but is not limited to, a global positioning system (GPS) or a positioning technology based on a wireless local area network or a mobile communications network.

The camera module 113 is configured to capture a picture or a video. The captured picture or video may be stored in the memory 101, and may be further sent to a host computer by using the radio frequency module 109.

The audio module 115 provides an audio interface to a user, which may include one or more microphone interfaces, one or more speaker interfaces and one or more earphone interfaces. Audio data is exchanged with another device by using the audio interface. The audio data may be stored in the memory 101, and may be further sent by using the radio frequency module 109.

The touchscreen 117 provides an input and output interface between the electronic device 100 and a user. Specifically, the user may perform an input operation such as a gesture operation like clicking, touching, and sliding by using the touchscreen 117. In response to the input operation, the electronic device 100 displays and outputs output content in any form of a text, a picture, or a video or a combination thereof to the user by using the touchscreen 117.

The key module 119 includes at least one key, to provide an interface for the user to input information to the electronic device 100. The user may press different keys to cause the mobile terminal 100 to perform different functions. For example, a volume key may be used for the user to adjust the volume of sound played by the electronic device 100.

It may be understood that the structure shown in FIG. 1 is only for the purpose of illustration. The electronic device 100 may alternatively include more or fewer components than those shown in FIG. 1, or have components different from those shown in FIG. 1. The components shown in FIG. 1 may be implemented by using hardware, software, or a combination thereof.

Figure 2:
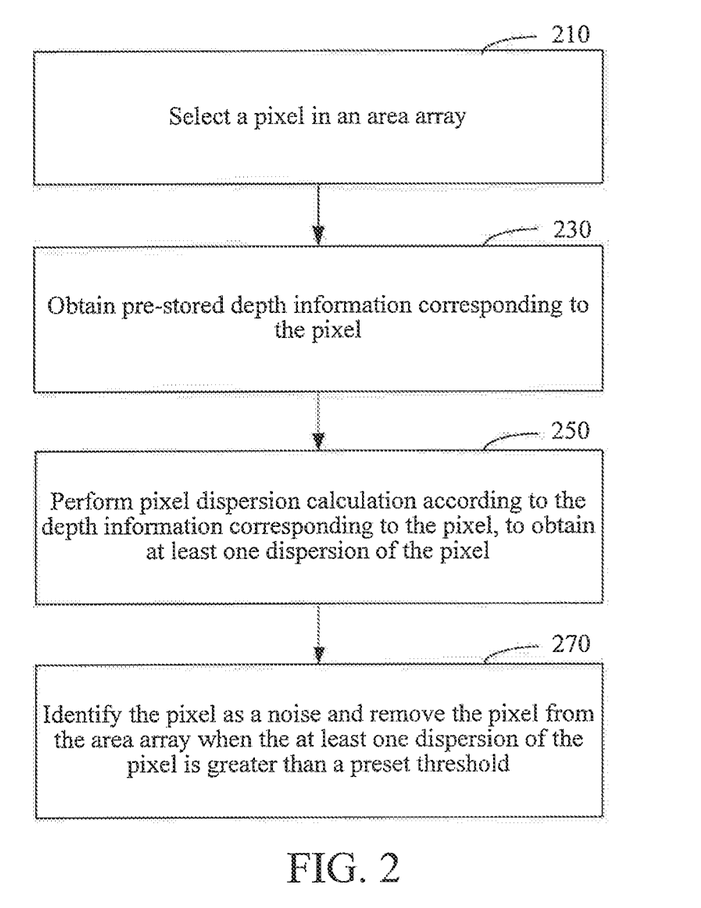
FIG. 2 is a flowchart of a noise processing method according to an exemplary embodiment.

FIG. 2 is a flowchart of a noise processing method according to an exemplary embodiment. The noise processing method may be performed by the electronic device 100 in FIG. 1. As shown in FIG. 2, the method may include the following steps:

Step 210. Select a pixel in an area array.

The area array is formed by arranging a plurality of pixels in a matrix. Reflected light received by a sensor includes a plurality of pixels. For example, if a resolution of the received light is 320*240 pixels, the light includes 320*240=76800 pixels. The pixels form the area array arranged as a matrix.

Further, the pixel in the area array may be selected according to a sequence in the area array, or may be selected through random sampling.

Step 230. Obtain pre-stored depth information corresponding to the pixel.

The sensor receives the reflected light, and calculates a phase difference between the pixel in the light and light emitted by the sensor.

Based on the above, in an exemplary embodiment, the depth information may be the phase difference, or may be a depth value calculated by using the phase difference. The depth value represents a distance between the sensor and an object that reflects the light.

A formula for calculating the depth value is: depth value=phase difference*maximum distance/maximum phase difference. The maximum distance is related to a frequency for modulating the light emitted by the sensor. The maximum phase difference is a parameter related to a sensor chip. Both the maximum distance and the maximum phase difference are fixed values.

After obtained, the depth information is stored in the sensor. Therefore, a degree of dispersion between the pixel and another pixel may be calculated according to the depth information, to remove a pixel corresponding to an excessively large degree of dispersion. It can be understood that, in other embodiments, the depth information may alternatively be stored in a memory other than the sensor.

Step 250. Perform pixel dispersion calculation according to the depth information corresponding to the pixel, to obtain at least one dispersion of the pixel.

The dispersion is used to indicate a degree of dispersion between the pixel and another pixel in the area array. The pixel dispersion calculation is a process of calculating according to the depth information corresponding to the obtained pixel and depth information of the another pixel, to obtain the dispersion of the pixel.

The dispersion is used to determine that whether the pixel is a noise. When the dispersion between the pixel and the another pixel is excessively large, it represents that the degree of dispersion between the pixel and the another pixel is excessively large. Therefore, it is determined that the depth information corresponding to the pixel is unreliable, that is, the pixel is a noise.

Further, in the dispersion calculation process, a plurality of dispersions corresponding to the pixel may be generated. In this case, the dispersion of the pixel may be determined based on one or more of the plurality of dispersions.

Step 270. Identify the pixel as a noise and remove the pixel from the area array when the at least one dispersion of the pixel is greater than a preset threshold.

The preset threshold is a critical value for determining whether the pixel is a noise. When the dispersion is greater than the preset threshold, it is determined that the pixel corresponding to the dispersion is a noise, and the pixel is removed, thereby implementing identification and removal of noises, and resolving a technical problem that generated noises may affect accuracy of the depth information.

In this embodiment, the technical problem that generated noises may affect accuracy of the depth information is resolved by implementing identification and removal of the noises in the area array.

In an exemplary embodiment, the step of selecting a pixel in an area array in the embodiment corresponding to FIG. 2 includes:

selecting pixels one by one according to a sequence of the pixels in the area array.

The pixels in the area array are arranged in a matrix. Therefore, the pixels are selected one by one according to the sequence of the pixels, which may be selected in the area array row by row, or may be selected in the area array column by column, to avoid a fact that a pixel is missed or selected twice.

In a specific implementation of an exemplary embodiment, a resolution of the light in the area array is set to 320*240 pixels. Therefore, the light includes 320*240=76800 pixels. Coordinates of the pixels may be set to $(X_0, Y_0)$, $(X_1, Y_0)$, ..., and $(X_{319}, Y_{239})$. The pixels are selected one by one according to a sequence of the coordinates of the pixels, to ensure that noise identification may be performed on all the pixels in the area array.

In this embodiment, the pixels are selected one by one according to the sequence of the pixels in the area array, thereby avoiding an error caused in a noise processing result because a pixel is missed or selected twice.

In an exemplary embodiment, the step of obtaining depth information corresponding to the pixel in the embodiment corresponding to FIG. 2 includes:

obtaining a phase difference of each pixel in the area array and taking the phase difference of each pixel as the depth information of the pixel.

The sensor receives the reflected light, and calculates phase differences of the pixels in the light. A phase difference between each pixel in the area array and the light emitted by the sensor is obtained by the sensor and is taken as depth information corresponding to the pixel, to identify and remove a noise according to the depth information.

In this embodiment, the phase difference of each pixel in the area array is obtained and is taken as the depth information of the pixel.

Figure 3:
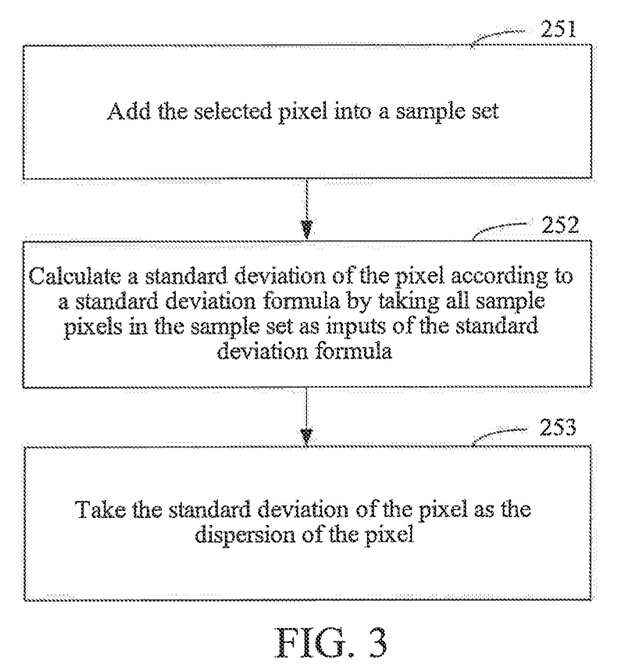
FIG. 3 is a flowchart of an embodiment of performing pixel dispersion calculation according to the depth information corresponding to the pixel, to obtain at least one dispersion of the pixel in the embodiment corresponding to FIG. 2.

FIG. 3 describes details of step 250 according to an exemplary embodiment. As shown in FIG. 3, step 250 may include the following steps:

Step 251. Add the selected pixel into a sample set.

The sample set may exist as a linked list. When a pixel is to be added, a pointer points to the to-be-added pixel, to add the pixel into the sample set. When a pixel is to be removed, a pointer that points to the to-be-removed pixel points to a next pixel, to remove the pixel from the sample set.

A sample capacity of the sample set is set. A quantity of pixels in the sample set is not greater than the sample capacity. A pixel is selected according to a sequence in the area array, and is added into the sample set. When the quantity of pixels in the sample set is greater than the sample capacity, a pixel that is firstly added into the sample set is removed from the sample set, to ensure that the quantity of pixels is not greater than the sample capacity.

Figure 4:
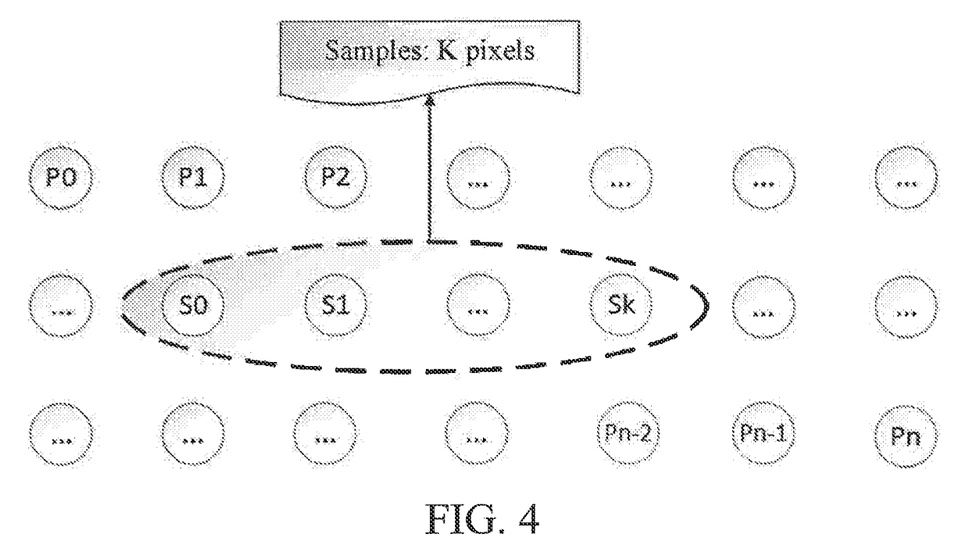
FIG. 4 is a schematic diagram of a sample set according to an exemplary embodiment.

As shown in FIG. 4, FIG. 4 is a schematic diagram of a sample set according to an exemplary embodiment. A sample capacity of the sample set is set to K. A pixel is selected and added into the sample set. When a quantity of pixels in the sample set is greater than K, a pixel that is firstly added into the sample set is removed from the sample set.

Step 252. Calculate a standard deviation of the pixel according to a standard deviation formula by taking all sample pixels in the sample set as inputs of the standard deviation formula.

The formula for calculating the standard deviation is:

$$s = \sqrt{s^2} = \sqrt{\frac{\sum_{i=1}^{k}(x_i - \bar{x})}{k-1}}$$

K is a quantity of pixels in the sample set, $x_i$ is depth information of a pixel, and $\bar{x}$ is an average value of depth information of the pixels in the sample set.

Step 253. Take the standard deviation of the pixel as the dispersion of the pixel.

In an embodiment, a value of K is 50. It can be understood that, in an actual application, the quantity K of pixels in the sample set may be other values, which is not strictly limited herein.

Figure 5:
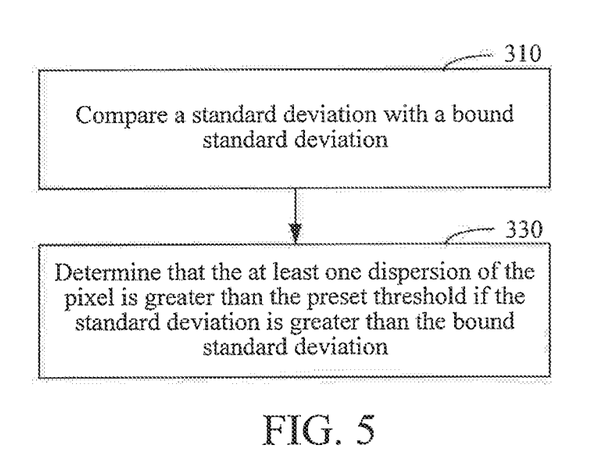
FIG. 5 is a flowchart of a noise processing method according to another exemplary embodiment.

FIG. 5 is a flowchart of a noise processing method according to another exemplary embodiment. As shown in FIG. 5, before the step of identifying the pixel as a noise and removing the pixel from the area array when the at least one dispersion of the pixel is greater than a preset threshold, the method may include the following steps:

Step 310. Compare a standard deviation with a bound standard deviation.

In a specific implementation of an exemplary embodiment, the bound standard deviation is the preset threshold, and is generally set to 0.5*maximum phase difference/ maximum distance.

Whether the standard deviation is greater than the preset threshold is determined by comparing the standard deviation with the bound standard deviation.

If the standard deviation is greater than the preset threshold, step 330 is performed.

Otherwise, if the standard deviation is not greater than the preset threshold, the step of selecting pixels one by one according to a sequence of the pixels in the area array is performed.

Step 330. Determine that the at least one dispersion of the pixel is greater than the preset threshold if the standard deviation is greater than the bound standard deviation.

Figure 6:
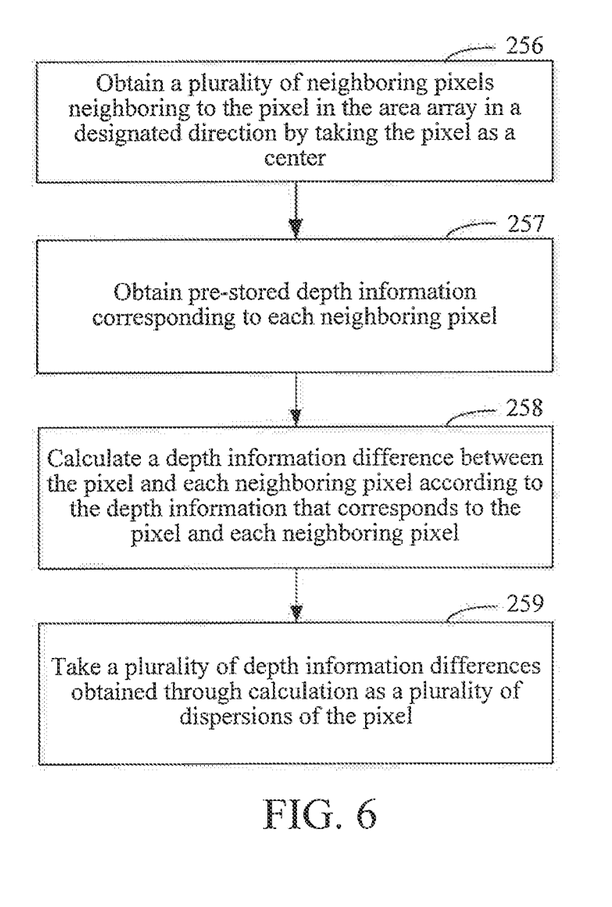
FIG. 6 is a flowchart of another embodiment of performing pixel dispersion calculation according to the depth information corresponding to the pixel, to obtain at least one dispersion of the pixel in the embodiment corresponding to FIG. 2.

FIG. 6 describes details of step 250 according to an exemplary embodiment. As shown in FIG. 6, step 250 may further include the following steps:

Step 256. Obtain a plurality of neighboring pixels neighboring to the pixel in the area array in a designated direction by taking the pixel as a center.

Figure 7:
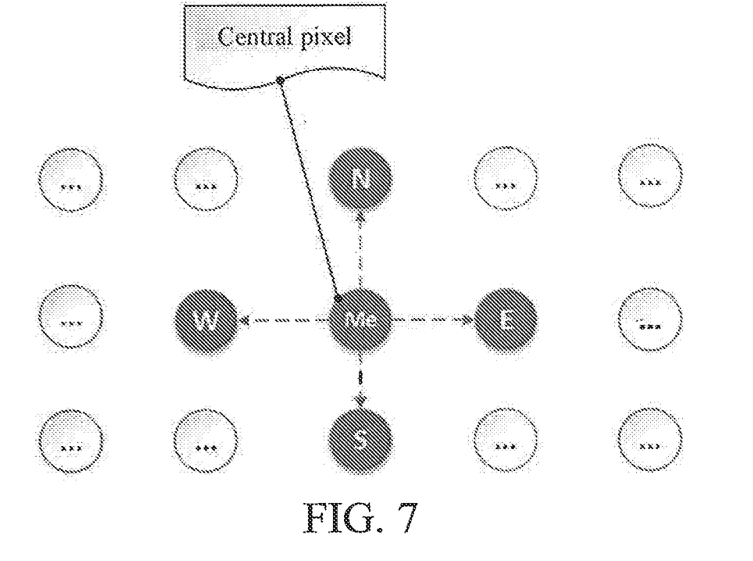
FIG. 7 is a schematic diagram of neighboring pixels according to an exemplary embodiment.

As shown in FIG. 7, FIG. 7 is a schematic diagram of neighboring pixels according to an exemplary embodiment.

In a specific implementation of an exemplary embodiment, the designated direction may be four directions such as east, south, west, or north, or may be four directions such as southeast, northeast, southwest, northwest, or may be eight directions including the above directions.

Pixels being neighboring mean that coordinates of the pixels are neighboring. For example, coordinates of a center pixel are $(X_1, Y_1)$, a pixel whose coordinates are $(X_1, Y_2)$ is a neighboring pixel located in the south of the central pixel, and a pixel whose coordinates are $(X_2, Y_2)$ is a neighboring pixel located in the southeast of the central pixel.

When the selected pixel is a pixel on the boundary (in a 320*240 area array, when $X_i=0$, $X_i=319$, $Y_i=0$ or $Y_i=239$, it represents that the selected pixel is a pixel on the boundary), the pixel may have no neighboring pixel in a direction. For example, $(X_0, Y_1)$ does not have a neighboring pixel in the west direction.

Specifically, when it is determined that a pixel does not have a neighboring pixel in a designated direction according to coordinates of the pixel, the neighboring pixel is not obtained in the designated direction.

Step 257. Obtain pre-stored depth information corresponding to each neighboring pixel.

As described above, the depth information is pre-stored in the sensor. Therefore, the depth information corresponding to each neighboring pixel may be obtained from the sensor.

In a specific implementation of an exemplary embodiment, the obtaining depth information corresponding to each neighboring pixel is obtaining a phase difference of the neighboring pixel. Then dispersion calculation is performed according to the depth information.

Step 258. Calculate a depth information difference between the pixel and each neighboring pixel according to the depth information that corresponds to the pixel and each neighboring pixel.

A formula for calculating the depth information difference is:

$$\sigma = |Me - \text{Neighbor}|$$

σ is the depth information difference between the pixel and the neighboring pixel, Me is the depth information corresponding to the pixel, and Neighbor is the depth information corresponding to the neighboring pixel. A difference between the depth information corresponding to the pixel and the depth information corresponding to each neighboring pixel is calculated, and an absolute value of the difference is taken as the depth information difference between the pixel and each neighboring pixel.

Step 259. Take a plurality of depth information differences obtained through calculation as a plurality of dispersions of the pixel.

In this embodiment, the plurality of dispersions of the pixel are obtained according to the depth information that corresponds to the pixel and the neighboring pixels.

Figure 8:
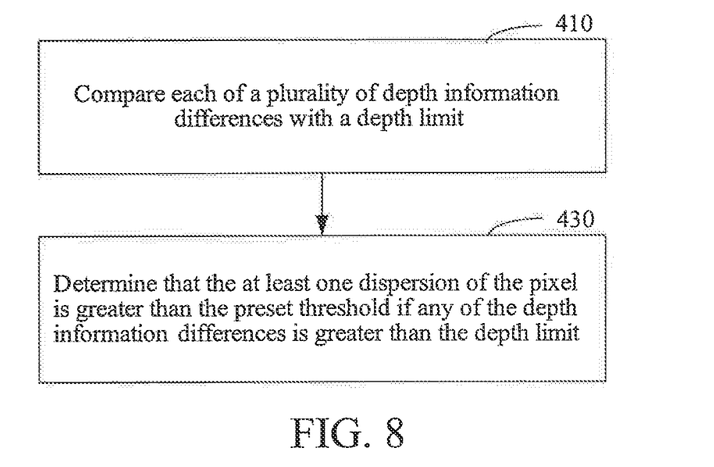
FIG. 8 is a flowchart of a noise processing method according to another exemplary embodiment.

FIG. 8 is a flowchart of a noise processing method according to another exemplary embodiment. As shown in FIG. 8, before the step of identifying the pixel as a noise and removing the pixel from the area array when the at least one dispersion of the pixel is greater than a preset threshold, the noise processing method may include the following steps:

Step 410. Compare each of a plurality of depth information differences with a depth limit.

In a specific implementation of an exemplary embodiment, the depth limit is the preset threshold. Each of the plurality of depth information differences is compared with the depth limit, to obtain a plurality of comparison results. Whether the at least one dispersion of the pixel is greater than the preset threshold is determined according to the plurality of comparison results.

If the at least one dispersion of the pixel is greater than the preset threshold, step 430 is performed.

Otherwise, if the at least one dispersion of the pixel is not greater than the preset threshold, the step of selecting pixels one by one according to a sequence of the pixels in the area array is performed.

Step 430. Determine that the at least one dispersion of the pixel is greater than the preset threshold if any of the depth information differences is greater than the depth limit.

It is determined that the at least one dispersion of the pixel is greater than the preset threshold as long as one depth information difference is greater than the depth limit. Therefore, the pixel is determined as a noise, and is removed.

Alternatively, in other application scenarios, the pixel may be determined as a noise when it is determined that more than two dispersions are greater than the preset threshold, which may improve accuracy of noise removal.

In this embodiment, it is determined whether at least one dispersion of the pixel is greater than the preset threshold.

Figure 9:
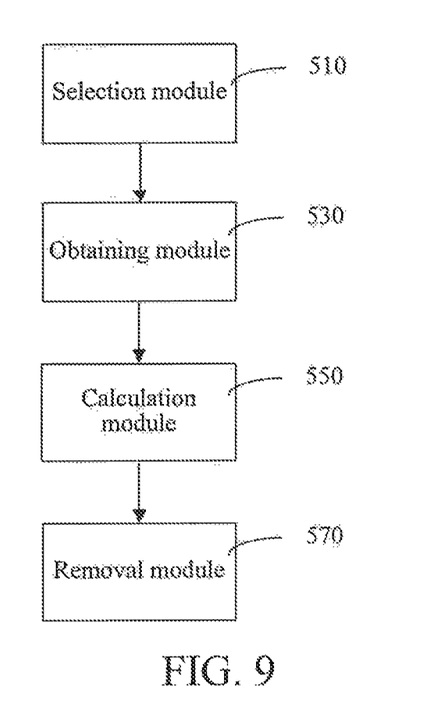
FIG. 9 is a block diagram of a noise processing apparatus according to an exemplary embodiment.

FIG. 9 is a flowchart of a noise processing apparatus according to an exemplary embodiment. The apparatus performs all or some of steps described above. As shown in FIG. 9, the apparatus includes but is not limited to: a selection module 510, an obtaining module 530, a calculation module 550 and a removal module 570.

The selection module 510 is configured to select a pixel in an area array, which is formed by arranging a plurality of pixels in a matrix.

The obtaining module 530 is configured to obtain pre-stored depth information corresponding to the pixel.

The calculation module 550 is configured to perform pixel dispersion calculation according to the depth information corresponding to the pixel, to obtain at least one dispersion of the pixel, the dispersion being used to indicate a degree of dispersion between the pixel and another pixel in the area array.

The removal module 570 is configured to identify the pixel as a noise and remove the pixel from the area array when the at least one dispersion of the pixel is greater than a preset threshold.

In an exemplary embodiment, the selection module according to the embodiment corresponding to FIG. 9 includes but is not limited to:

a sequential selection unit, configured to select pixels one by one according to a sequence of the pixels in the area array.

In an exemplary embodiment, the present invention includes a noise processing apparatus. The noise processing apparatus performs all or some of steps of the noise processing method shown in FIG. 2. The noise processing apparatus includes:

a processor; and a memory, configured to store processor executable instructions;

the processor being configured to:

select a pixel in an area array, which is formed by arranging a plurality of pixels in a matrix;

obtain pre-stored depth information corresponding to the pixel;

perform pixel dispersion calculation according to the depth information corresponding to the pixel, to obtain at least one dispersion of the pixel, the dispersion being used to indicate a degree of dispersion between the pixel and another pixel in the area array; and identify the pixel as a noise and remove the pixel from the area array when the at least one dispersion of the pixel is greater than a preset threshold.

The implementation processes of the functions and effects of the modules in the above-described apparatus is described in detail in the implementation processes of the corresponding steps in the above-described noise processing method and will not be described herein again.

It should be understood that the present invention is not limited to the precise structures described above and shown in the accompanying drawings, and various modifications and changes can be made without departing from the scope of the present invention. The scope of the present invention is subject to the appended claims.

What is claimed is:

1. A noise processing method, comprising:
   selecting a pixel in an area array, which is formed by arranging a plurality of pixels in a matrix;
   obtaining pre-stored depth information corresponding to the pixel;
   performing pixel dispersion calculation according to the depth information corresponding to the pixel, to obtain at least one dispersion of the pixel, the dispersion being used to indicate a degree of dispersion between the pixel and another pixel in the area array;
   identifying the pixel as a noise and removing the pixel from the area array when the at least one dispersion of the pixel is greater than a preset threshold;
   wherein performing pixel dispersion calculation according to the depth information corresponding to the pixel comprising:
   adding the selected pixel into a sample set;
   calculating a standard deviation of the pixel according to a standard deviation formula by taking all sample pixels in the sample set as inputs of the standard deviation formula; and
   taking the standard deviation of the pixel as the dispersion of the pixel.

2. The method according to claim 1, wherein the step of selecting a pixel in an area array comprises:
   selecting pixels one by one according to a sequence of the pixels in the area array.

3. The method according to claim 1, wherein the step of obtaining pre-stored depth information corresponding to the pixel comprises:
   obtaining a phase difference of each pixel in the area array and taking the phase difference of each pixel as the depth information of the pixel.

4. The method according to claim 1, wherein the preset threshold is a bound standard deviation, and before the step of identifying the pixel as a noise and removing the pixel from the area array when the at least one dispersion of the pixel is greater than a preset threshold, the method further comprises:
   comparing the standard deviation with the bound standard deviation; and
   determining that the at least one dispersion of the pixel is greater than the preset threshold if the standard deviation is greater than the bound standard deviation.

5. The method according to claim 1, wherein the step of performing pixel dispersion calculation according to the depth information corresponding to the pixel, to obtain at least one dispersion of the pixel further comprises:
   obtaining a plurality of neighboring pixels neighboring to the pixel in the area array in a designated direction by taking the pixel as a center;
   obtaining pre-stored depth information corresponding to each neighboring pixel;
   calculating a depth information difference between the pixel and each neighboring pixel according to the depth information that corresponds to the pixel and each neighboring pixel; and
   taking a plurality of depth information differences obtained through calculation as a plurality of dispersions of the pixel.

6. The method according to claim 5, wherein the preset threshold is a depth limit, and before the step of identifying the pixel as a noise and removing the pixel from the area array when the at least one dispersion of the pixel is greater than a preset threshold, the method further comprises:
   comparing each of the plurality of depth information differences with the depth limit; and
   determining that the at least one dispersion of the pixel is greater than the preset threshold if any of the depth information differences is greater than the depth limit.

7. A noise processing apparatus, comprising:
   a processor; and
   a memory configured to store executable instructions;
   the processor being configured to:
   select a pixel in an area array, which is formed by arranging a plurality of pixels in a matrix;

obtain pre-stored depth information corresponding to the pixel;

perform pixel dispersion calculation according to the depth information corresponding to the pixel, to obtain at least one dispersion of the pixel, the dispersion being used to indicate a degree of dispersion between the pixel and another pixel in the area array; and identify the pixel as a noise and remove the pixel from the area array when the at least one dispersion of the pixel is greater than a preset threshold;

wherein performing pixel dispersion calculation according to the depth information corresponding to the pixel comprising:

adding the selected pixel into a sample set;

calculating a standard deviation of the pixel according to a standard deviation formula by taking all sample pixels in the sample set as inputs of the standard deviation formula; and taking the standard deviation of the pixel as the dispersion of the pixel.

\* \* \* \* \*